E. S. SAVAGE.
GAGE FOR TANKS.
APPLICATION FILED JULY 31, 1912.

1,072,876.

Patented Sept. 9, 1913.

2 SHEETS—SHEET 1.

Witnesses:
C. W. Carroll
L. Thon

Inventor:
Edward S. Savage
by his attorneys
Osgood, Davis & Worsey

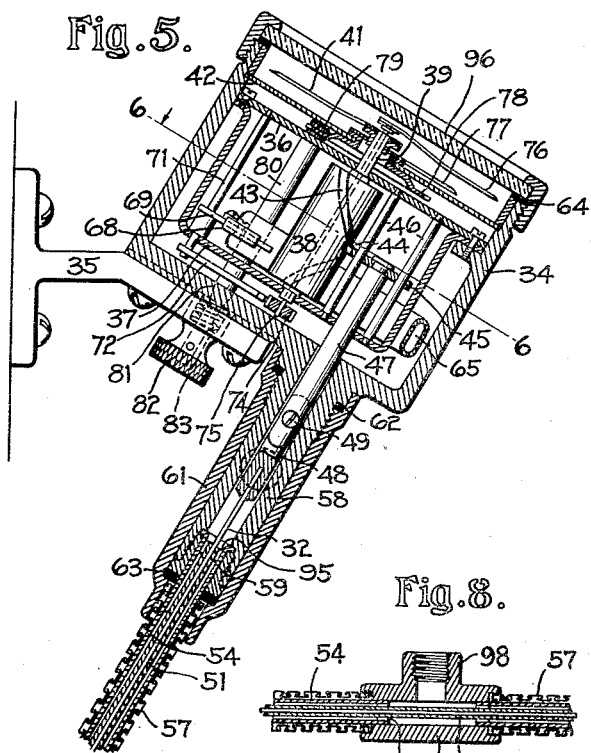

UNITED STATES PATENT OFFICE.

EDWARD S. SAVAGE, OF ROCHESTER, NEW YORK.

GAGE FOR TANKS.

1,072,876.  Specification of Letters Patent.  Patented Sept. 9, 1913.

Application filed July 31, 1912. Serial No. 712,535.

*To all whom it may concern:*

Be it known that I, EDWARD S. SAVAGE, a citizen of the United States, and resident of Rochester, in the county of Monroe and State of New York, have invented certain new and useful Improvements in Gages for Tanks, of which the following is a specification.

This invention relates to a gage by which the depth or volume of liquid in a tank is visually indicated at a point remote from the tank, and by which also the air-pressure within the tank, where such pressure is employed, may be visually indicated at the same point.

One object of the invention is to produce a device of the kind in question having various novel and efficient features of construction relating to the float-mechanism within the tank, the mechanism by which the indicating hands or pointers are actuated, and the flexible connections between the float-mechanism and the indicator-mechanism.

Another object of the invention, relating particularly to its use in connection with a tank, such as the fuel-tank of an automobile, in which air-pressure is employed within the tank, is to combine, in a novel and simple manner, the gage-mechanism and the means for introducing compressed air into the tank.

The various novel features of the invention, and the preferred embodiment thereof, will be more particularly pointed out in the following description of the gage illustrated in the accompanying drawings.

Figure 1:
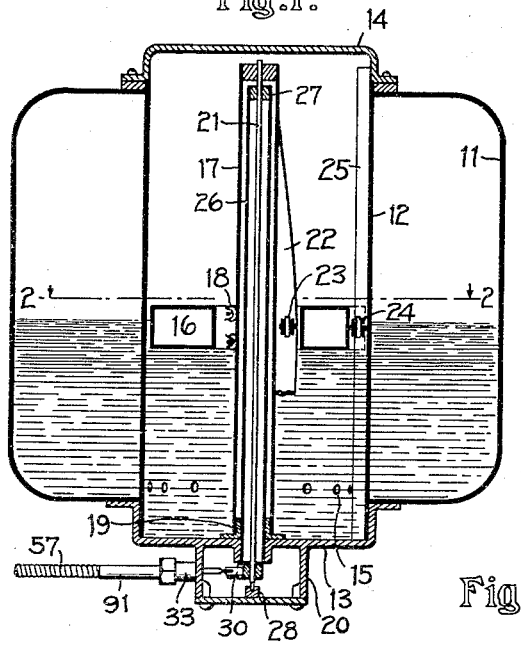
Figure 2:
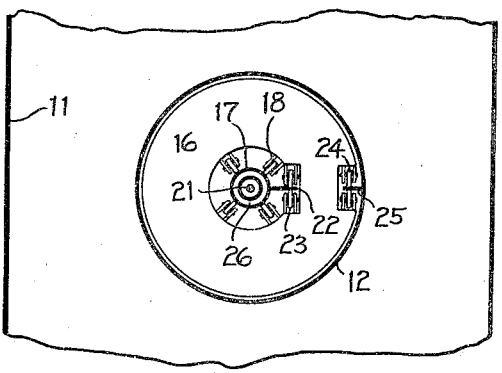
Figure 3:
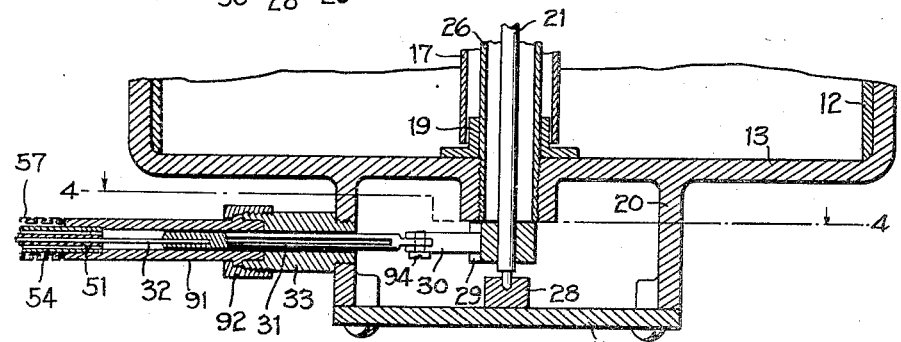
Figure 4:
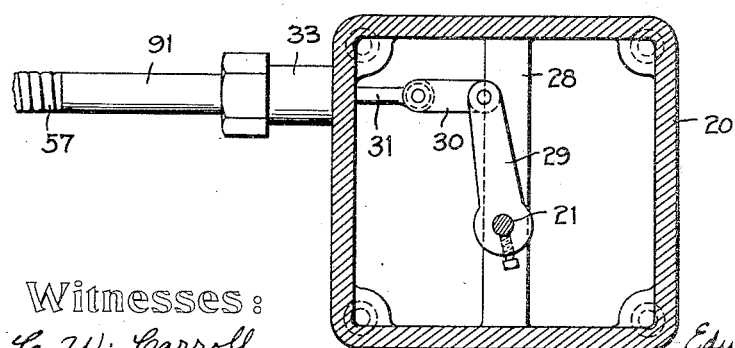

In the drawings:—Figure 1 is a vertical section of a tank provided with a float-mechanism constituting a part of a gage constructed in accordance with the present invention; Fig. 2 is a section on the line 2—2 in Fig. 1; Fig. 3 is a detail-view, on a larger scale, showing particularly the mechanical connections at the bottom of the tank of Fig. 1; Fig. 4 is a plan-view, in section on the line 4—4 in Fig. 3; Fig. 5 is a vertical section of the indicator; Fig. 6 is a section on the line 6—6 in Fig. 5; Fig. 7 is a view of the upper end of the indicator; Fig. 8 is a vertical section of a detail of the connections between the air-pump, the tank and the indicator; Fig. 9 is a detail-view, on an enlarged scale, of a portion of the connecting-wire; and Fig. 10 is a diagrammatic view showing the gage as used in connection with an automobile, the mechanical connections with the float-mechanism being somewhat different from those in Figs. 1 to 4.

The invention is illustrated as employed in connection with the gasolene-tank of an automobile, a use for which it is particularly adapted, although it is suitable for various other uses. The tank 11, as shown in Figs. 1 to 4, is provided with a vertical, cylindrical float-chamber 12, which extends somewhat above and below the top and bottom of the tank so as to provide sufficient space for the movements of the float. The upper end of the float-chamber is closed by a removable cap 14, while the lower end is closed by a bottom 13. The float-chamber is perforated, as at 15, to permit the liquid to pass freely into and out of it. The float 16 is circular, and is provided with a central opening. At the vertical axis of the float-chamber is a tube 17 which constitutes a guide for the float, the float being provided with rollers 18 which bear against the tube. This tube also constitutes a rotary member for transmitting movement from the float to the indicator. For this reason the lower end of the tube is journaled upon a bearing-sleeve 19 fixed to the bottom 13, while the upper end of the tube is fixed, by means of a bushing, as shown in Fig. 1, to the upper end of a shaft 21.

In order that the vertical movements of the float may cause rotative movements of the guide-tube 17 a helical flange 22 is fixed to the tube, and is embraced between two rollers 23 journaled on the float. Two other rollers 24, also journaled on the float, engage a straight, vertical flange 25 fixed to the inner surface of the float-chamber. The flange 25 prevents the float from rotating, and accordingly, as the float rises and falls, the rollers 23 and the flange 22 cause rotative movements of the guide-tube, of an amplitude proportionate to the vertical movements of the float. The arrangement of flanges and rollers just described permits the float to actuate the guide-tube and to rise and fall with a minimum of resistance due to friction, particularly at the connections between the float and the tube, where the greatest friction would otherwise occur.

The shaft 21 is journaled in a bushing 27 at the upper end of a tube 26. This tube passes through, and is fixed in, the bottom of the casing 13, and it extends above the highest level of the liquid in the tank, so that it prevents the escape of liquid from the bottom of the tank, thus dispensing with the necessity of a packed joint at this point. The lower end of the shaft 21 projects through the bottom of the tube 26, and is journaled in a cross-bar 28 fixed at the bottom of a casing 20 which extends downwardly from the bottom 13.

The float-mechanism is connected with the indicator by means of a flexible wire which is adapted to act positively under either tension or compression, according to the direction of movement of the float-mechanism. Accordingly, a crank-arm 29 is fixed near the lower end of the shaft 21, and is connected, by means of a link 30, with a slide-rod 31 which, in turn, is connected with one end of the flexible wire 32. The rod 31 slides and is guided in a sleeve 33 projecting from the casing 20, so that rectilinear movements are imparted to it by the angular movements of the crank-arm 29.

The indicator-mechanism is shown particularly in Figs. 5, 6 and 7. A cylindrical casing 34 is supported by a bracket 35 by which it may be fixed at any convenient point, as, for example, on the dash-board of an automobile. Within the casing 34 is a frame comprising an upper plate 36 and a lower plate 37, and these plates are centrally perforated to receive the journals of a drum 38. The upper journal 39 of the drum carries a hand or pointer 41 which coöperates with graduations upon a dial-plate 42, these graduations indicating measures of depth or volume in the tank. The drum is provided with a helical groove 43, and this groove is engaged by a projection 44 formed upon a slide-plate 45. The plate 45 is guided upon rods 46 fixed at their ends in the frame-plates 36 and 37, so that the slide-plate moves parallel to the axis of rotation of the drum 38, and in such movements the projection 44 causes the drum to rotate and to impart angular movements to the pointer 41 proportionate to the movements of the slide-plate. The slide-plate 45 is fixed to the upper end of a rod 47 which slides in a sleeve 58 projecting from the bottom of the casing 34. The rod 47 is connected, by a lap-joint and a screw 49, with a short rod 48 which, in turn, is connected with the end of the flexible wire 32. Accordingly, by the mechanism just described, the pointer 41 is moved, through the longitudinal movement of the wire 32, in accordance with the vertical movements of the float.

A novel feature of the invention resides in the construction of the flexible wire and the flexible sheathing in which it is guided. In order that the indications of the gage may be accurate it is necessary that the mechanism respond to very slight differences of level in the tank, and accordingly the friction between the wire 32 and its sheath must be reduced as far as possible by making the wire as flexible as is consistent with sufficient strength. Accordingly, I employ a very slender wire of resilient metal, such as hard bronze, and inclose this wire in a metal guide-tube 51 which fits it so closely as to prevent any substantial lateral movement or lost-motion of the wire, while at the same time allowing the wire to slide freely through the tube even when the latter has been bent in a curved form to connect the tank and the dial after they have been placed in convenient position for use. In order to avoid the necessity of using an excessively small guide-tube, and also to facilitate the movement of the wire and assist in the lubrication of the wire in the tube, I employ a wire such as is illustrated, on a magnified scale, in Fig. 9. This wire has a central core 88, which is wound closely and uniformly from end to end with a fine wire 89. This winding does not substantially diminish the flexibility of the wire, but it increases the diameter of the wire substantially, thus permitting the use of a larger guide-tube, and at the same time it produces a surface which is adapted to hold a considerable amount of lubricating-oil and to maintain this oil, by capillary action, against the bearing-surfaces. To protect the slender guide-tube 51 against accidental injury it is inclosed within a larger tube 54, and the latter, in turn, is inclosed by a flexible, spiral metal tube 57. For convenience in assembling or disassembling the mechanism of the gage the casing 20 at the bottom of the tank is provided with a removable cover 53 by which access may be had to the crank-mechanism. The adjacent ends of the tubes 57 and 51 are fixed to a sleeve 91 which is connected, by a union 92, with the sleeve 33. Upon removing the screw 94 which connects the link 30 with the rod 31, and unscrewing the union 92, the sleeve 91 may be disconnected from the sleeve 33 and the rod may be withdrawn from the latter, thus detaching the flexible connections from the float-mechanism. Detachable connections are also provided at the indicator, and for this purpose the end of the tube 54 is removably secured to the sleeve 58 by means of a screw-plug 59. The adjacent end of the guide-tube 51 is supported centrally within the tube 54 by means of spaced members 95 which afford between them air-passages for a purpose which will presently be described.

In order that the indicator may show the air-pressure within the tank, as well as the volume or depth of liquid, the sheath for the flexible wire is so constructed as to act also as an air-passage, the space between the guide-tube 51 and the outer tube 54 serving for this purpose. The air passes, through the slight space existing between the rod 47 and the sleeve 58, into the indicator-casing 34. Here it acts upon a tube 65 of the form familiar in pressure-gages, and commonly described as a "Bourdon tube." The action of the air upon this tube is opposite to the usual action in pressure-gages, however, since the pressure is against the outer surface of the tube instead of the inner. One end of the tube is fixed to the wall of the casing, as shown in Fig. 6, and communicates with the atmosphere through a passage 66. The tube thus constitutes, in effect, a septum subjected, on opposite sides, to the pressures within and without the casing, and this arrangement causes the tube to respond to variations in the air-pressure in the casing 34 in substantially the usual manner, although in directions opposite to the movements which would be imparted to it by variations in its internal pressure.

The free end of the Bourdon tube is connected, by a link 67, with a slide 68 mounted upon a lever-arm 69. This arm is fixed to a rock-shaft 71 journaled in the frame-plates 36 and 37, and the lower end of the shaft carries a second lever-arm 72 provided, at its free end, with a gear-segment 73. This segment meshes with a pinion 74, which is fixed to the lower end of a shaft 75 journaled axially within the drum 38. The upper end of the shaft 75 carries a hand or pointer 76 which coöperates with a second series of graduations on the dial 36, these graduations indicating degrees of air-pressure. The slide 68 is fixed on the lever-arm 69 by a screw 60 which passes through a slot in the slide, and by loosening this screw and moving the slide the pressure-gage mechanism may be adjusted as required.

To prevent leakage of air at the junction between the wire-casing and the indicator-casing a sleeve 61 is threaded upon the sleeve 58 and is seated, at its upper end, against a gasket 62, while its lower end is seated against a gasket 63. The upper end of the casing 34 is also closed air-tight by a glass 96, clamped against a gasket 64. When the flexible connections are to be detached from the indicator the sleeve 61 is first unscrewed and drawn downwardly upon the casing 57. The screw 49 is then removed, access being had to this screw through an opening in the sleeve 58, shown in dotted lines in Fig. 5. The screw-plug 59 may then be unscrewed, and the wire 32 and the rod 48 withdrawn from the sleeve 58.

In addition to serving as a means for incasing the flexible wire and for communicating air-pressure between the tank and the indicator, the flexible sheath may, in some cases, be employed also as means for transmitting compressed air to the tank. For this purpose a T-shaped connecting-member 97 is interposed at any convenient point in the sheath, as shown in Figs. 8 and 10, this connection having a lateral branch 98 which is connected, by a tube 84, with any ordinary or suitable source of air-supply, such as the air-pump 85. In this manner the connections between the air-pump, the indicator and the tank are greatly simplified, and a self-contained outfit is provided which may be manufactured inexpensively and easily installed and kept in order.

The form of float-mechanism illustrated in Figs. 1 to 4 is particularly adapted for use in connection with a tank from which the liquid is fed by the action of gravity and without the use of air-pressure, as such tanks are most conveniently provided with mechanical connections extending from the bottom. In the case of a tank in which air-pressure is employed the tank is usually placed in a low position, as in the case of the tank 86 shown in Fig. 10, and in this case the mechanical connections are most conveniently made at the upper end of a guide-tube 87 which performs substantially the same functions as the guide-tube 17 in Fig. 1. The crank-mechanism for connecting the guide-tube with the flexible wire may be substantially similar to that already described. In either construction the air-pressure when used is communicated between the tank and the wire-casing through the space between the slide-rod 31 and its guiding-sleeve, the rod being grooved for this purpose, as shown in Fig. 3.

In order that the user of the gage may be enabled to conveniently record the amount of fuel used in any given time, I employ an indicating device which may be set to correspond with the position of the pointer 41, and which then remains as set. As shown in Figs. 5 and 6, this device comprises a pointer 77, which is fixed to a flanged hub projecting through a central perforation in the dial and formed upon a gear 78 below the dial. This gear meshes with a pinion 79 formed upon the upper end of a shaft 80, which is journaled, at its upper end, in the frame-plate 36. This shaft projects through the bottom of the casing 34, having a tapered bearing 78 which forms an air-tight fit against the casing. A knurled head 82 is fixed to the lower end of the shaft to afford convenient means for rotating the shaft, and with it the gear 78 and the pointer 77. The head 82 is recessed to receive a spring 83, shown in dotted lines in Fig. 5, this spring acting to maintain the close fit between the shaft and the casing and also to produce sufficient friction to retain the pointer wherever it is set. As shown in Fig. 7 the pointer 77 indicates that at the time when it was set the pointer 41 indicated 20 on the dial, and that the subsequent consumption has been equal to the difference between 20 and the present position of the pointer 41, which is between the numbers 9 and 10.

I am aware that it has been previously proposed to connect an indicator with a float-mechanism by means of a flexible member or wire, but in such previous construction, owing to difficulties which I have overcome by novel features above described, this wire has been employed only under tension, this tension being maintained by a spring in the indicator-mechanism, so that the indicator is moved positively in one direction, while its movements in the opposite direction are produced by the spring. Such a construction is unsatisfactory, however, for the reason that the constant tension upon the wire, due to the action of the spring, produces a prohibitive amount of friction between the wire and its sheath, thus interfering with the sensitive action of the gage.

My invention is not limited to the embodiment thereof hereinbefore described and illustrated in the accompanying drawings, but may be embodied in various other forms within the nature of the invention as it is defined in the following claims.

I claim:—

1. In combination with a tank for holding liquid, a gage comprising a tube extending upwardly from, and fixed at, the bottom of the tank; a guide-tube surrounding the fixed tube; a shaft journaled in the fixed tube and connected, at its upper end, with the guide-tube; a float surrounding the guide-tube, stationary means for preventing free rotation of the float, connections between the float and the guide-tube for rotating the latter as the float rises and falls; an indicator located at a point external to the tank; and means for connecting the indicator with the shaft below the bottom of the tank; the fixed tube extending upwardly, in the tank, above the highest level of the liquid therein, whereby liquid is prevented from escaping around the shaft.

2. In combination with a tank for holding liquid, a gage comprising a vertical rotatable cylindrical member provided with a longitudinal flange and mounted in the tank; a float surrounding said member and provided with rollers engaging said flange closely on opposite sides and other rollers engaging opposite portions of the cylindrical member to hold the float concentric therewith, a second flange adjacent the periphery of the float; means, on the float, engaging said second flange; and a visual indicator connected with and actuated by the rotatable member, one of said flanges being helical in form, whereby said rotatable member is caused to turn as the float rises and falls.

3. A gage for tanks comprising a float adapted to rise and fall in a tank; a visual indicator adapted to be located at a distance from the tank; connections between the float and the indicator, for actuating the latter, including a flexible wire acting positively to move the indicator in both directions, by alternative tension and compression; and a guide-tube closely but loosely inclosing the wire, so as to restrict it to longitudinal movement, the guide-tube and the wire being sufficiently flexible to be bent into a curved form without interfering with the operation of the wire.

4. A gage for a tank comprising a float adapted to rise and fall in the tank; a visual indicator located at a distance from the tank; connections between the float and the indicator, for actuating the latter, including a flexible wire having a solid core and a winding of wire thereon, said core being sufficiently stiff to operate in one direction by longitudinal compression; and a fixed guide-tube closely but loosely inclosing the flexible wire.

5. In combination with an air-tight tank for holding liquid under pressure, a float adapted to rise and fall in the tank, a visual indicator located at a distance from the tank, mechanical connections between the indicator and the float, for actuating the indicator, including a flexible wire, an air-tight sheath inclosing and guiding the wire, and an air-pump for supplying compressed air to the tank, the pump being connected with said sheath, whereby the sheath acts also as an air-duct to conduct air from the pump to the tank.

6. In combination with an air-tight tank for holding liquid under pressure, a visual indicator located at a distance from the tank and having means for indicating both the liquid-volume and the air-pressure, a float adapted to rise and fall in the tank, mechanical connections between the float and the volume-indicating means comprising a flexible wire extending from the tank to the indicator, an air-tight sheath inclosing said wire and extending from the tank to the indicator, said sheath constituting an air-passage between the tank and the pressure-indicating means, and an air-pump for supplying compressed air to the tank, said pump being connected with the sheath, whereby the sheath provides a passage to conduct air from the pump to the tank.

7. In combination with an air-tight tank for holding liquid under pressure, an indicator located at a distance from the tank and having means for indicating both the volume of liquid and the degree of pressure in the tank, a float adapted to rise and fall in the tank, connections between the float and the volume-indicating means, for actuating the latter, comprising a flexible wire, a guide-tube closely embracing said wire and extending from the tank to the indicator, and an outer air-tight tube inclosing the guide-tube and communicating, at its ends, with the tank and with the pressure-indicating means, said outer tube serving to conduct air-pressure between the tank and said means, to actuate the latter.

8. In combination with an air-tight tank for holding liquid under pressure, an indicator located at a distance from the tank and having means for indicating both the volume of liquid and the degree of pressure in the tank, a float adapted to rise and fall in the tank, connections between the float and the volume-indicating means, for actuating the latter, comprising a flexible wire, a guide-tube closely embracing said wire and extending from the tank to the indicator, an outer air-tight tube inclosing the guide-tube and communicating, at its ends, with the tank and with the pressure-indicating means, said outer tube serving to conduct air-pressure between the tank and said means to actuate the latter, and an air-pump connected with said outer tube, whereby the latter affords a passage for transmitting compressed air from the pump to the tank.

9. In combination with an air-tight tank for holding liquid under pressure, a float adapted to rise and fall in the tank; a glazed air-tight casing; an air-tight sheath connecting the casing and the tank; a volume-indicating device movable within the casing; mechanical connections between the float and said device for actuating the latter, said connections passing through said sheath; a pressure-indicating device also movable within the casing; and means for actuating the pressure-indicating device, said means comprising a Bourdon tube inclosed within the casing and subjected externally to the varying pressure therein, said tube being connected internally with the exterior atmosphere.

EDWARD S. SAVAGE.

Witnesses:
 BESSIE DENNIS,
 FARNUM F. DORSEY.

---

It is hereby certified that in Letters Patent No. 1,072,876, granted September 9, 1913, upon the application of Edward S. Savage, of Rochester, New York, for an improvement in "Gages for Tanks," an error appears in the printed specification requiring correction as follows: Page 4, line 36, after the compound word "guide-tube," line 37, after the word "float," and line 57, after the word "therewith," strike out the commas and insert semicolons; and that the said Letters Patent should be read with this correction therein that the same may conform to the record of the case in the Patent Office.

Signed and sealed this 7th day of October, A. D., 1913.

[SEAL.]

R. T. FRAZIER,

*Acting Commissioner of Patents.*